July 31, 1934.  G. F. KOTRBATY  1,968,045
BUILDING CONSTRUCTION
Filed Jan. 16, 1931   9 Sheets-Sheet 1

Inventor
Guy F. Kotrbaty.
By his Attorney
Austen +Dix

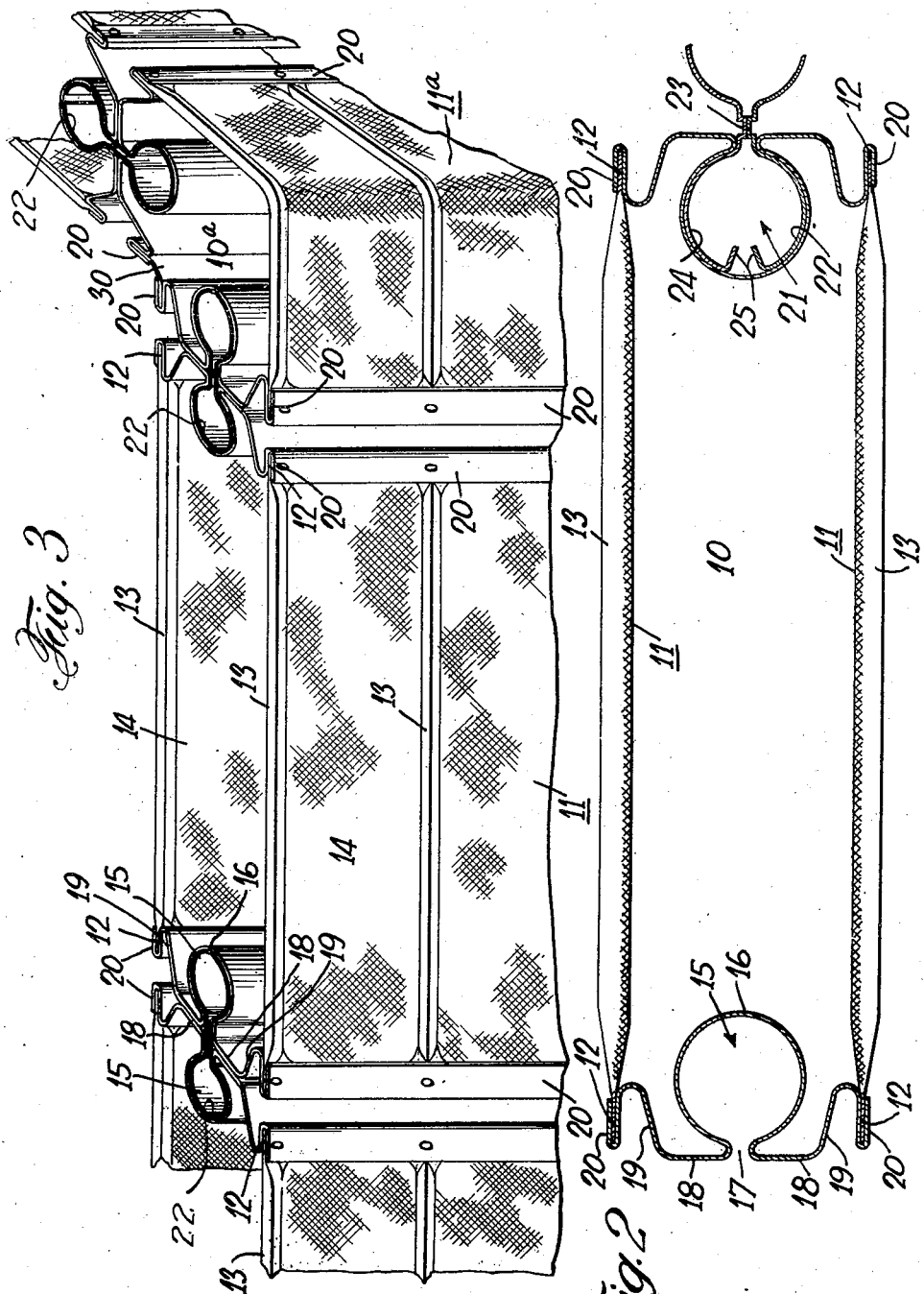

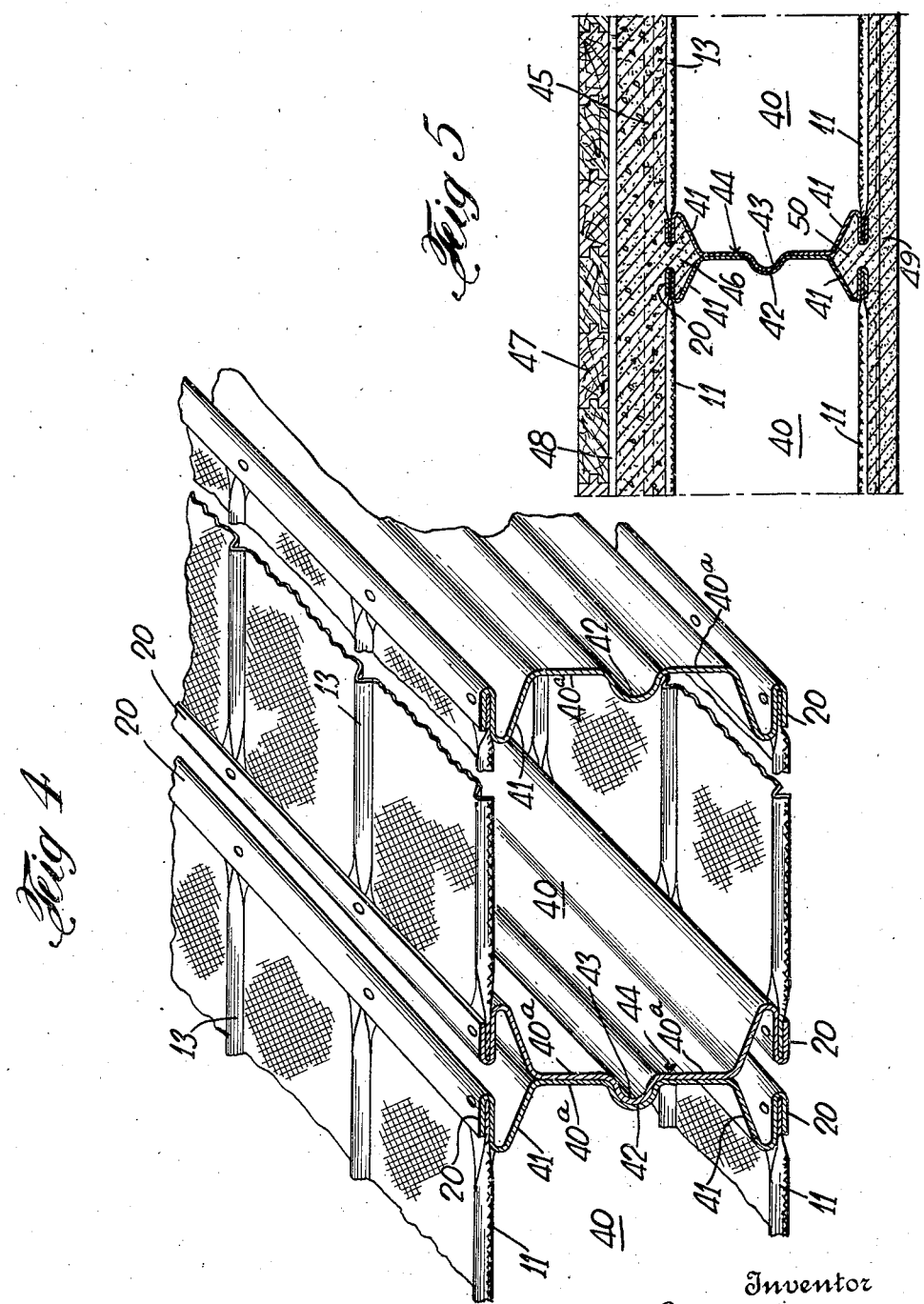

July 31, 1934. G. F. KOTRBATY 1,968,045
BUILDING CONSTRUCTION
Filed Jan. 16, 1931 9 Sheets-Sheet 4
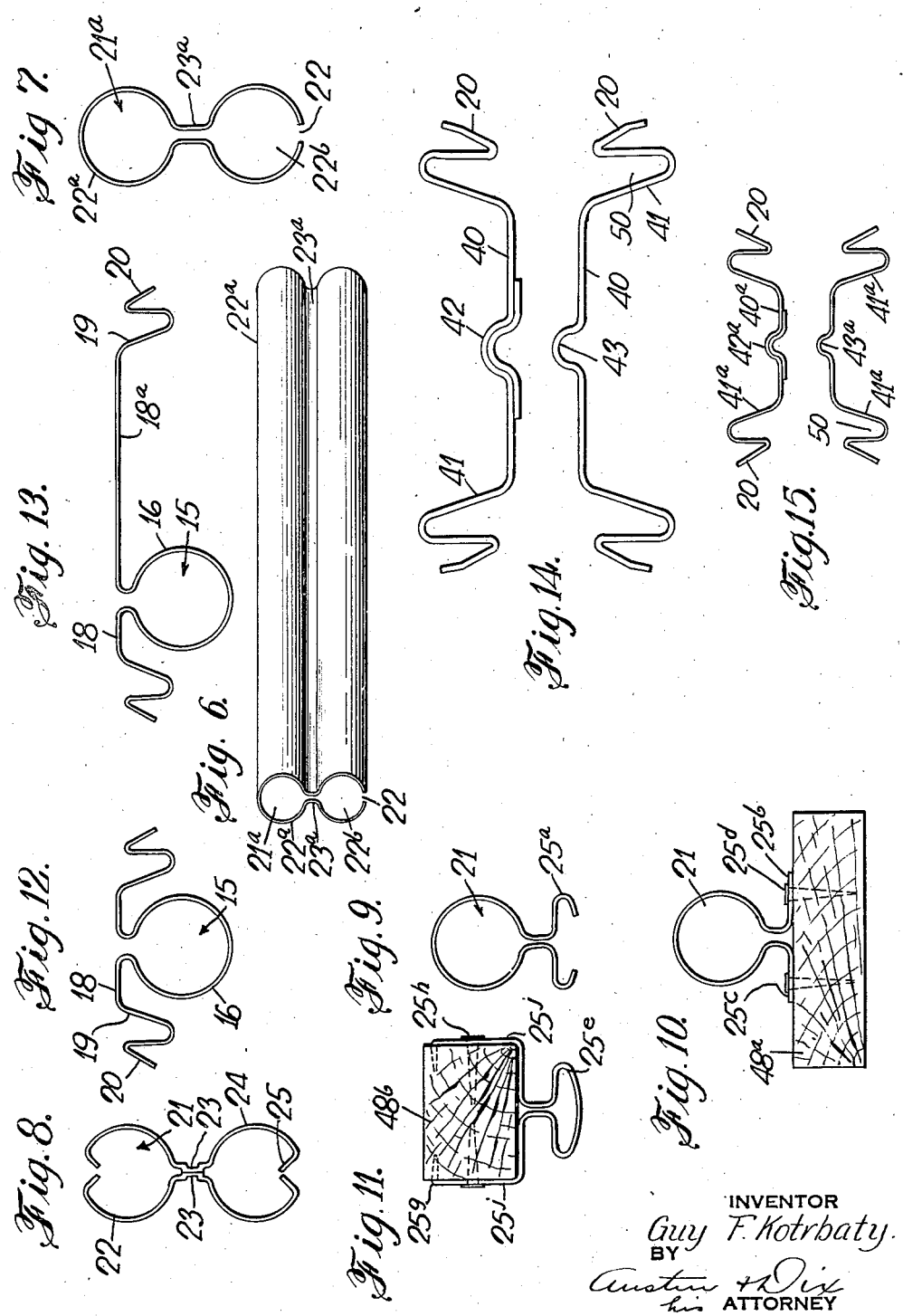
INVENTOR
Guy F. Kotrbaty.
BY
Austin +Dix
his ATTORNEY

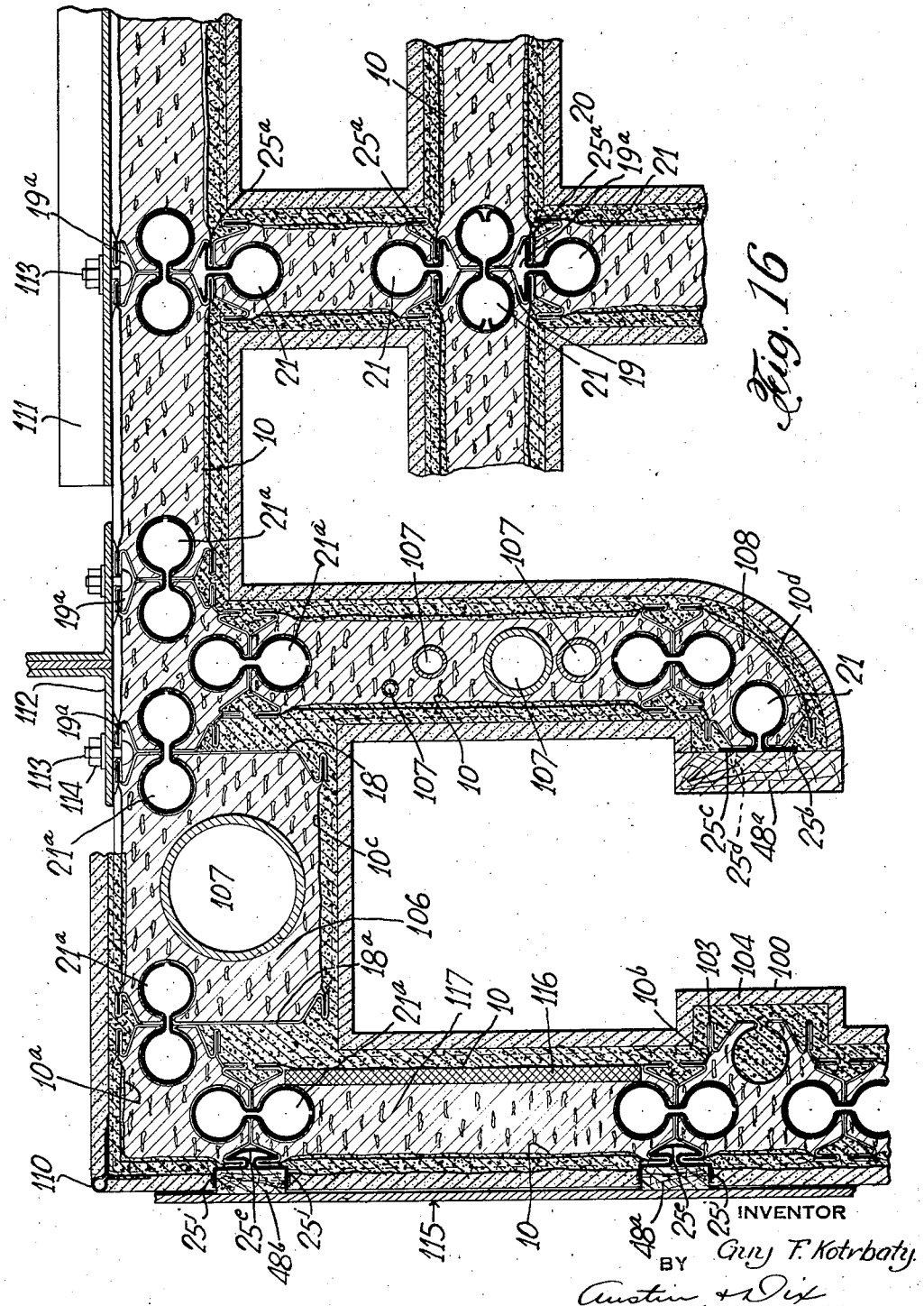

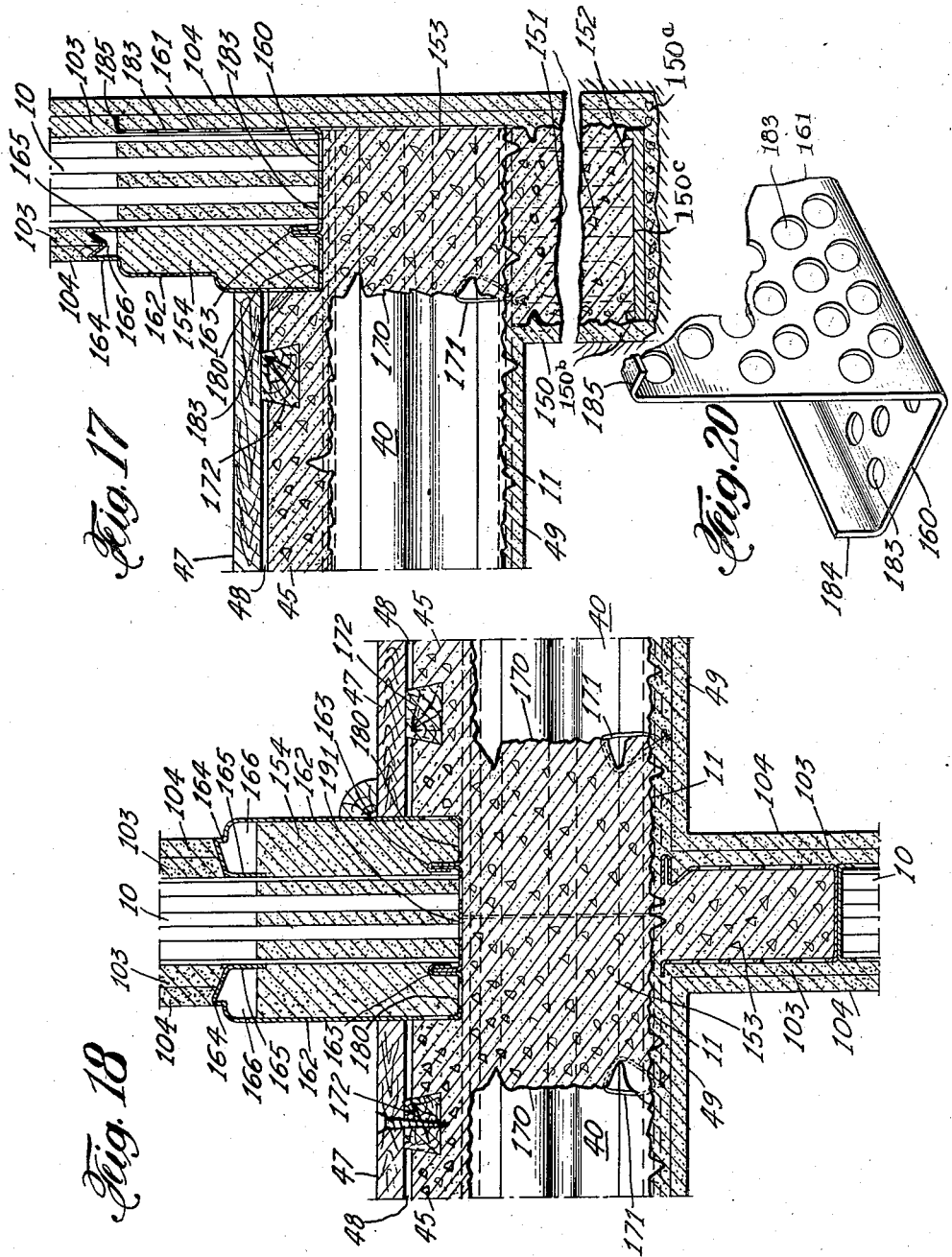

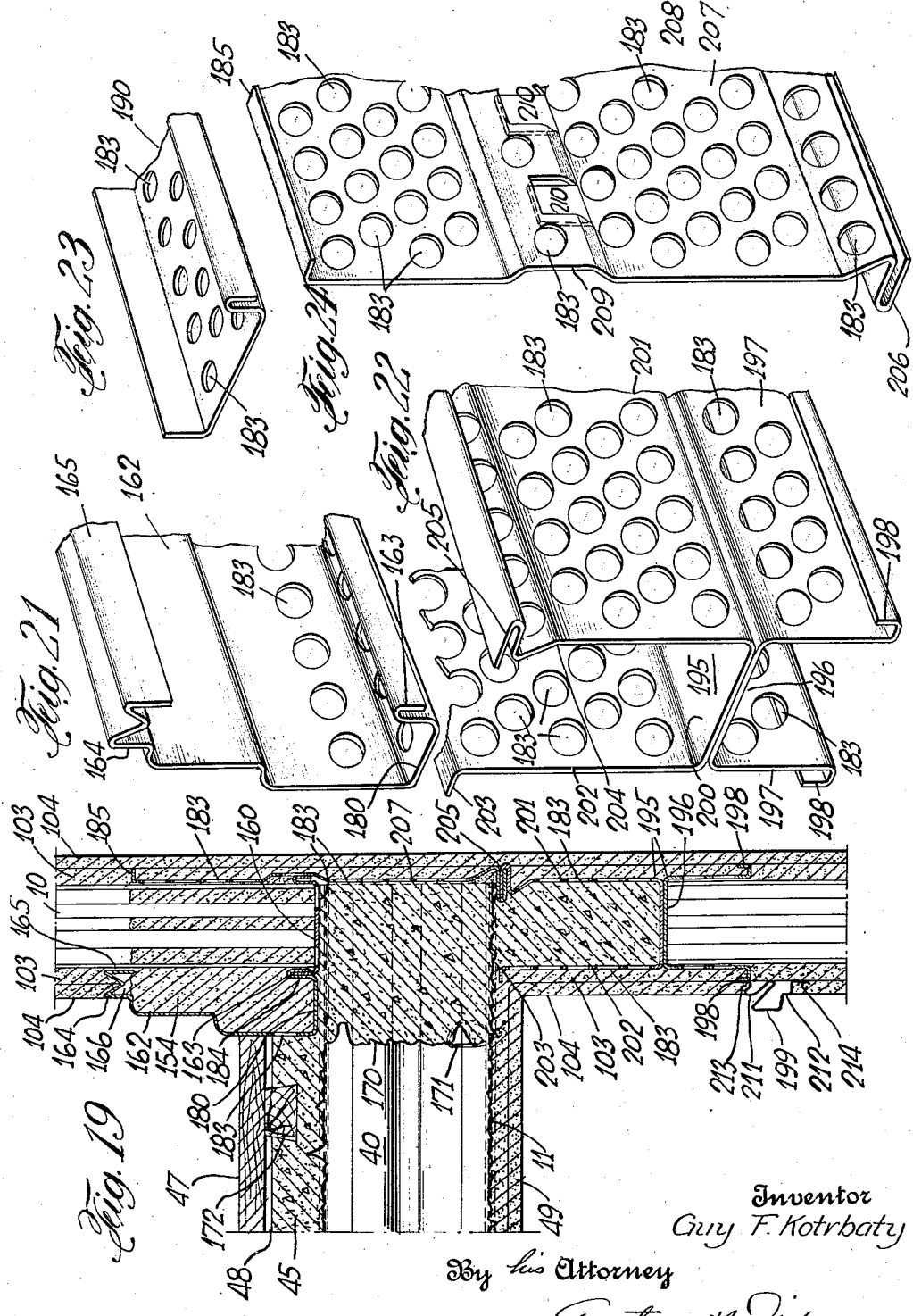

July 31, 1934.  G. F. KOTRBATY  1,968,045
BUILDING CONSTRUCTION
Filed Jan. 16, 1931    9 Sheets-Sheet 8
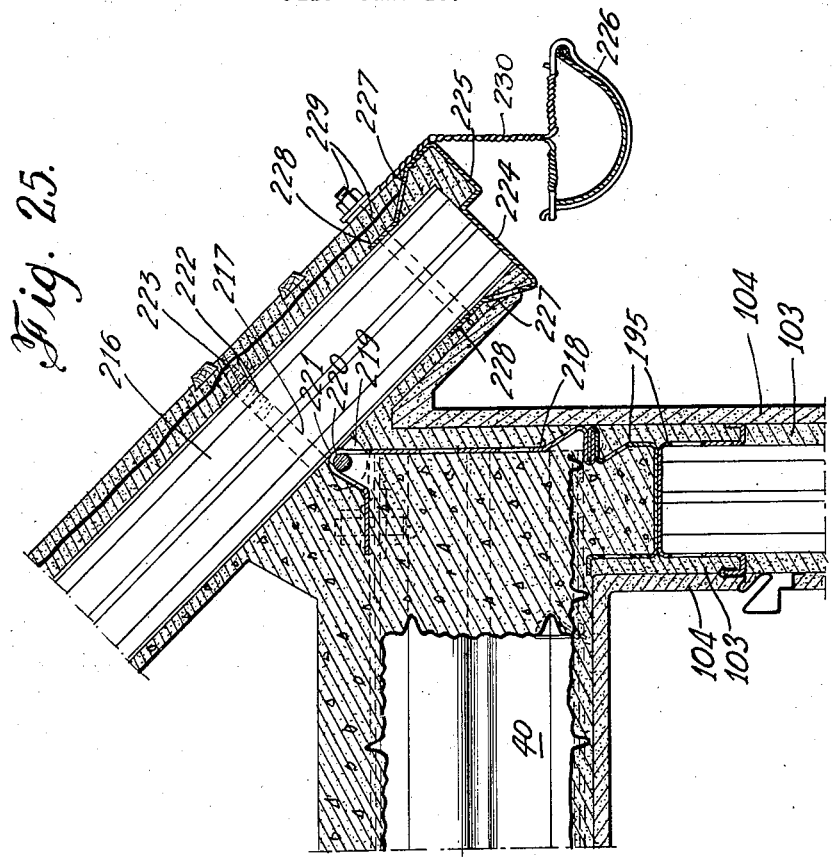
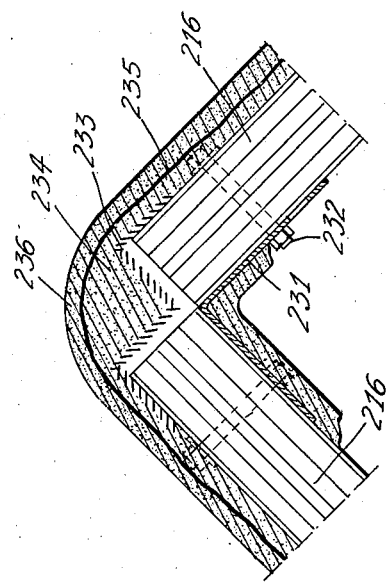
INVENTOR
Guy F. Kotrbaty.
BY
Austin N Dix
his ATTORNEY July 31, 1934.  G. F. KOTRBATY  1,968,045
BUILDING CONSTRUCTION
Filed Jan. 16, 1931   9 Sheets-Sheet 9
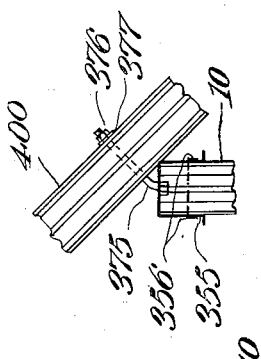
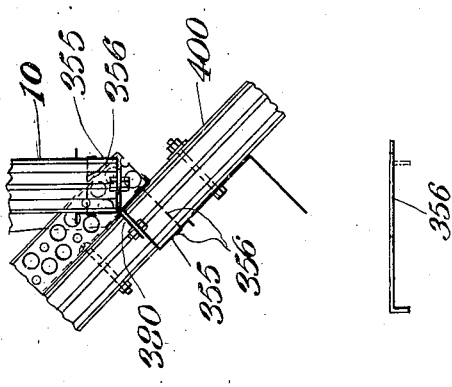
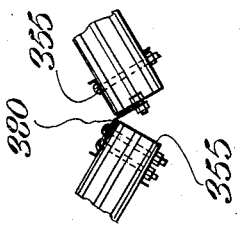
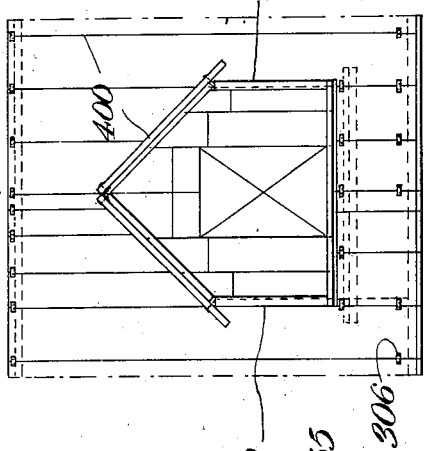
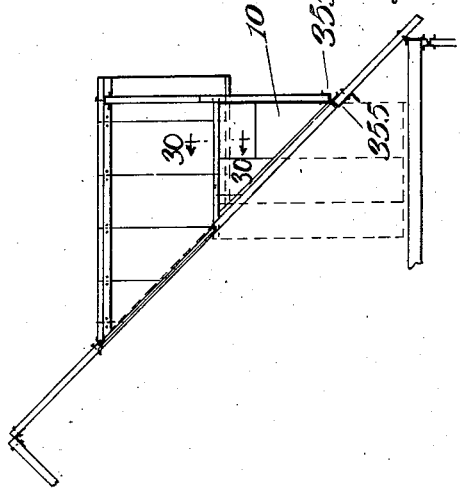
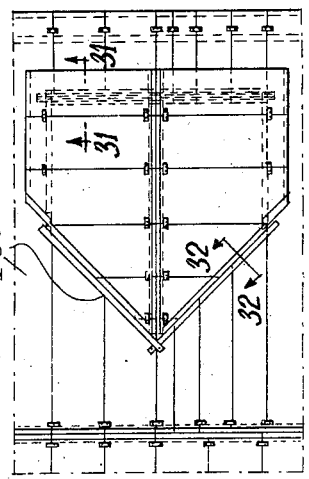
INVENTOR
Guy F. Kotrbaty.
BY
Austin Dix
his ATTORNEY Patented July 31, 1934

1,968,045

UNITED STATES PATENT OFFICE 1,968,045

BUILDING CONSTRUCTION

Guy F. Kotrbaty, New York, N. Y., assignor to Ferrocon Corporation, New York, N. Y., a corporation of Delaware Application January 16, 1931, Serial No. 509,237
In Great Britain February 25, 1930

11 Claims. (Cl. 72—1)

This invention relates to improvements in building construction units, and more particularly to the method of fabricating novel metal buildings of all sizes provided with a variety of plastic and non-plastic finishes and bonding materials.

The present invention is directed primarily to the formation of a novel construction unit or grid element, which is adapted to be preformed, and is so constituted and arranged as to permit a plurality of them to be readily associated into any desired type of structure.

The desirable economies in construction will be set forth more in detail in the accompanying specification, reference being had to the drawings, in which like numerals refer to similar parts throughout the several views, and in which Figure 1 is a front elevation, partly in section, of a house embodying the principles of this invention;

Figure 2 is a horizontal cross section of an improved construction member adapted for walls;

Figure 3 is an elevation, partly in section, of an assembly of elements shown in Figure 2, including a corner connecting member;

Figure 4 is a perspective view, partly in section, of a plurality of improved floor construction members;

Figure 5 is a vertical cross section through a floor and ceiling, showing the manner of use of the members illustrated in Figure 4;

Figure 6 is a perspective view of an improved key member;

Figure 7 is a cross section of the structure shown in Figure 6;

Figure 8 is a cross section of a modified form of key member;

Figure 9 is a cross section of an intersecting wall key;

Figure 10 is a cross section of a key member adapted to permit the fastening of other materials to the grid members;

Figure 11 is a furring strip key;

Figure 12 is a cross section of a grid key way;

Figure 13 is a modified form of the structure shown in Figure 12;

Figure 14 is a cross section of a floor grid beam member;

Figure 15 is a modified form of the structure shown in Figure 14, and adapted for roof and partition constructions;

Figure 16 is a top plan view of a portion of a wall section constructed of members illustrated in Figures 2 to 15, and showing a preferred mode of assembly, together with associated service mains;

Figure 17 is a vertical cross section taken through a section of a building at the junction of the foundation and first floor;

Figure 18 is a vertical section taken through the alined partitions in a house, together with associated floor assembly;

Figure 19 is a view similar to Figure 17 showing preferred connections between upper floors and outer wall;

Figure 20 is a detail of a base connecting member for connection of main house wall to foundation wall above grade line;

Figure 21 is a detail of a base mould and structural member;

Figure 22 is a detail, partly in section, of a wall cap grid member and floor grid supporting member;

Figure 23 is a detail of a channel member adapted to receive the wall grid and serve as a support therefor;

Figure 24 is an elevation, partly in section, of a wall tie member adapted to be interposed between two floors;

Figure 25 is a vertical cross section through a roof and wall junction;

Figure 26 is a vertical cross section through a ridge portion;

Figure 1:
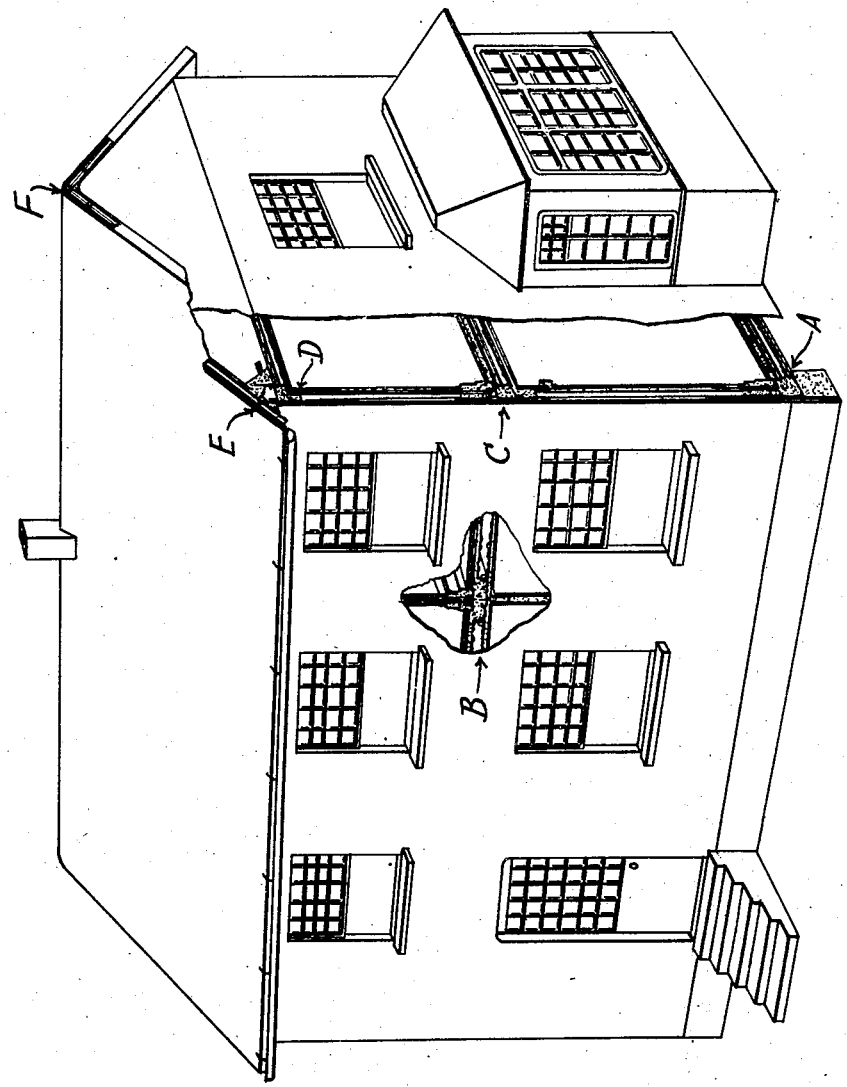

Figures 27, 28, and 29 are elevations of an improved dormer construction illustrating the method of assembling the construction members of Figure 2; and Figures 30, 31, and 32 are details of connections for dormers and roof.

Referring now to Figure 1, there is shown a complete building structure including the usual basement and floor construction, as well as wall members, the method of joining the several parts being indicated in broken sections. The method of assembling of foundation and floor member is indicated generally at A, and is shown more in detail in Figure 17. The method of supporting floors and forming internal partitions is indicated generally at B, and is shown more in detail in Figure 18. The method of associating floor members with outside walls is indicated at C, and shown more in detail in Figure 19. The eave structure is indicated at E in Figure 1, and in detail in Figure 25, while the roof cap or ridge construction is indicated generally at F, and illustrated in detail in Figure 26.

Referring now to the drawings, the improved construction member shown in Figures 2 and 3, and designated generally by the numeral 10, comprises a pair of opposed wall members 11 of sheet metal, which may be solid or of any suitable foraminous metallic construction. These members may be provided with a plurality of stiffening members 13, which as shown are indicated as integral horizontal stiffening ribs. However, it will of course be appreciated that the stiffening members may be vertically disposed or they may comprise associated members such as stiffening rods or battens, which may be secured to either or both sides of the members as by soldering, brazing, or welding, and such members may be opposed on either side of the members 11 and 12 to provide an increased stiffening effect. If desired, foraminous metal of the expanded metal lath type may be used, and a desirable stiffening imparted thereto by weaving or otherwise associating stiffening wires therethrough in any desired manner.

The sections 14 disposed between the stiffening members 13 may be of solid metal as above indicated, or may comprise expanded lath portions, or perforated sections.

The side members are connected together by means of combination end sections and keyways, as shown in Figures 2, 12, and 13 and designated generally as 15, which usually comprise a central cylindrical portion 16 having an aperture 17 and oppositely disposed flanges 18, which flanges are continued at 19 to form re-entrant sections, which, in turn, are reversely bent to form clip members 20 adapted to be secured in locking engagement with the ends 12 of members 11. The members 10 may be varied in depth to form pilaster sections or the like by varying one or more of the sections 18 of members 15, as indicated at 18a in Figure 13. The side members and keyways may be crimped together, or they may be bonded as by soldering, brazing, or integrally joined as by welding.

Referring more particularly to Figures 2 and 8, the construction members may be abutted together to form a desired construction, and secured to each other by means of key members 21 disposed therein. These key members may comprise a pair of opposed semi-cylindrical sections 22 abutted at mid point 23, and provided with open ends 24, which may have re-entrant flanges 25, if desired. The members 22 are so constructed as to provide a snug fit in the keyways 15, and preferably should be sufficiently large to completely fill the keyways. By this means the wall members are metallically joined together, and a complete joint is formed between the two sides of the abutted members, to make a composite structural member.

Where desired, the members 22 may comprise a pair of opposed cylindrical members 26 and 27, one of which has an open portion 28, the whole being formed of a single piece of metal bent or otherwise configured to the desired shape to give the necessary resiliency to the key members. The key members may be rolled to shape in suitable rolling machines, the sections being suitably contoured to permit easy fabrication and insertion in the keyways. It will also be appreciated that the rounded corners provided throughout permit large savings in die maintenance, as well as preventing strains in the keys due to sharp angles in the stressed portions.

Where it is desired to form a corner connecting member of any configuration, the keyways are abutted in a desired fashion, and suitable clip members 30 are secured between a pair of opposed members 20, and a section 11a is conformed as desired, and in turn secured between the other clip portions of the keyways to form a corner grid member designated generally as 10a.

Referring now to Figure 16, there is shown a partial plan view of a floor layout in which the method of forming interior partitions and pilasters, as well as interior members such as staircases and the like is shown. The walls generally are formed of the usual wall grid members 10 abutted together in the usual manner by the expansible keys 21 or 21a described more in detail hereinabove.

Where it is desired to form a cased opening or other decorative member of the pilaster type against a wall, as indicated generally at 100, it will be sufficient to use a three-way connecting grid 10b, the angularly disposed keyway and ties adjacent being filled with any suitable embedding plastic and configured as desired, as shown at 103. Over this plastic surface is applied the usual outer plastic coating 104.

The pilaster grids 10c are formed in substantially the same manner as the wall grids, the ends of the structures being provided with oversized lateral end channels 18a. The members so formed, it will be seen, provide an internal space 106 which is particularly adapted for the reception of pipe stacks, plumbing fixtures, electric wiring conduits and the like, indicated generally by the numeral 107. As will be referred to more in detail hereinafter, this flexibility of construction permits the introduction and manipulation of various services, such as plumbing, wiring, etc., with a minimum of trouble, and without requiring added building features, which feature is characteristic of the grid members generally when it is desired to so use them, the various inserts being made to conform to the requisite dimensions.

An added feature of advantage in this substantially mono-metallic construction, particularly when used in construction serviced by electricity, is the possibility of using the building structure itself as a ground for various types of electrical apparatus. It will also be apparent that due to this continuous metallic construction, dangers due to lightning discharges on or in the near proximity of such buildings are substantially minimized, due to the fact that lightning being a high frequency discharge tends to travel or discharge itself over the exterior surfaces only of a metallic conductor ("skin-effect"), with the result that substantially the entire outer area of a building constructed according to the method of this invention serves as a conducting path for any such discharges, and, by providing a direct metallic conducting path to ground, affords a chance for complete dissipation of such current into the ground without involving any heat effects due to eddy currents, particularly due to hysteresis in the mass, and also due to the fact that concrete and other plastics are permeable to high frequency currents, especially when moist or wetted during a storm, the monolithic bonding of the metal members making up the exterior of the structures does not in any way afford an undesirable impedance to the current. It will, of course, be appreciated that the superposed grids being directly metallically connected by the key members, due to the maximum conductive surface afforded by virtue of their configuration, the keyways afford a plurality of parallel conductive paths entirely surrounding the house, and of a size and conductive value equivalent to heavy bus bars, and thus capable of draining any charge in the grid portions proper between the keyways. The keys and their associated keyways afford a maximum conductive path, and being in parallel relation throughout the entire house impart a desirable safety factor to the grid members proper by reducing and promptly draining any current set up in the latter, and also due to their parallel arrangement being short circuited throughout, their entire inductive effects are wholly done away with so that the outer walls of such a construction effectively act as metallic screen for any and all electrical apparatus contained within the structure.

Partition walls, as previously described, may be formed by providing three-way keyway members 10b, and abutting suitable grids 10 thereagainst, the whole being keyed by the usual keys 21 or 21a.

Where it is desired to form a round corner, the grids 10d may be made up as shown at 108, wall grid portion 109 of any suitable curvature being disposed between adjacent keyways. By suitably juxtaposing four members of the type of 10d, it will be possible to make a pillar or column having a maximum of structural strength while embodying a minimum amount of structural material, a superficial coat of plastic for decorative purposes being necessary, although if such a pillar or column is intended for supporting heavy floor loads or the like, in addition to subserving its ornamental function, the keyway and space members may be filled with concrete or other suitable embedment.

To protect the plastic coatings at square corners, there may be used a metallic corner bead 110 integral with the corner section of member 10a, or separately formed therefrom and secured thereto by means of wire ties, brazing, soldering, or welding, the finished coat of plastic being finished flushed with the edges of the members which is thus adapted to serve as a plasterer's guide, as well as to prevent the corners from all mechanical injury.

As noted hereinbefore, internal partitions and the like may be readily formed by utilizing clip members 25a associated with keys 21 for insertion into channels 19a formed by the flanges 19 and clip portions 20. The partition wall grids are fitted in place in the usual manner and keyed in the manner herein described.

It will thus be seen that in order to provide any desired number of partition walls at any particular place, it will merely be necessary to vary or appropriately design the wall grid members to present channel members 19a at any desired place. The channels 19a thus permit the association of auxiliary structures and the elaboration of internal construction without involving any general change in the structure, also without involving any ripping out or cutting of the grid members themselves. Where it is desired to provide fire-escapes, or stair risers 111, or connections to other steel structures, such as H-column 112, headed bolts 113 may be slipped into the channels 19a and the auxiliary structures above referred to bolted in place by means of nuts 114 screwed on to bolts 113.

To provide a support for ornamental timbering, clapboarding, sheathing, or roofing, etc., and shingle strips designated by the numeral 115, it will suffice to insert members 25e, as shown in Figure 11.

To provide suitable support for doors and lintels and the like, a retaining member 48a, as shown more particularly in Figure 10, may be secured to a key member having lateral clip portions 25d.

In Figures 4 and 5, there is shown a floor grid member 40, which comprises top and bottom sections 11 as previously described. Owing to the heavier loads imposed on such members in the construction now being described, it is preferred to use a heavier weight material on the top side which supports the floor loads, whereas the bottom side, serving as a ceiling support, can be made of any light gauge material of suitable strength. The combined floor and ceiling members are supported and spaced from each other by means of interposed web members 40a, which comprise flange portions 41 which terminate in clip members 20, and centrally disposed depressed portions or grooves 42. To facilitate the abutment of adjoining members, the sections 42 on one side of a floor member may be inverted to form a tongue portion 43 adapted to abut and engage the grooves 42, thus forming a composite I-beam 44, having flange portions 41 and web portions 40, as above noted. When the floor members have been properly abutted together, a suitable plastic coating 45 of cement, or concrete, or other cementitious material, is poured thereover to a desired thickness. This coating will flow into and between the flanges 41 forming a monolithic key member 46 which serves, when set, to hold the flange portions together and also to act as a stiffener of the composite flange thus formed, being in fact an integral component part of the composite beam member. The top or compression member of the composite beam is thus more firmly bonded and enabled to withstand and transmit the compression strains imparted by the imposed loads. It will also be noted that section 46 of the composite flange is also an integral part of the monolithic floor covering 45, thus serving to bridge the floor sections immediately above adjacent grid sections and distribute the imposed loads evenly on either side. A suitable floor covering 47 of wood may be applied on top of the concrete covering 45, the wooden members being suitably secured to wood or metal sleepers 48 embedded in the concrete. If desired, the top floor covering may be made of linoleum, tiling, asphalt base materials, or any other suitable floor covering. The bottom or ceiling portion of the structure may have the usual coatings of lime, cement, gypsum, or other suitable plastic materials 49 applied thereto. This material is also flowed into and between the bottom flange portion 41, as indicated generally at 50, thus serving as an additional anchor for the plastic coating. The member 50 thus formed also acts as a stiffener for the composite flange member, as has been described above. Where desired, any suitable non-plastic coating material may be applied or suitably secured to the ceiling portion by means of wood, or metal sleepers, or furring strips, clipped to the flanges or tied to the foraminous portions of the members 11.

Referring now to Figures 6 and 7, there is shown a modified key member 21a comprising two cylindrical sections 22a and 22b, the latter being opened as indicated at 22c, and the members being integrally joined by resilient webs 23a. These members are formed in one piece from suitable gauge metal, such as copper bearing steel or other material, the configuration being such as to permit the several parts to expand into close contact with the sections 16 of the keyway with which they may be associated. While the key members have been shown as comprising two opposed resilient cylindrical sections, it will be understood that any desired number of key members may be associated together in any angular relation. Thus it will be possible to form a four-way key member in which the sections are at right angles to each other, or clip members may be substituted for any of the key sections.

As shown in Figure 9, the key members may be provided with integral clip sections 25a, which are adapted to fit into the sockets formed by the portions 19 of abutting construction members. This construction is particularly adapted for partition walls and other like structures.

Where it is desired to build a wall jutting out from a previously built wooden support or joist 48a, the key members are provided with flanges 25b apertured as indicated at 25c, the whole being secured to the joist or other supporting members by means of nails or screws 25d, as shown in Figure 10.

Referring to Figure 11, there is shown the method of securing furring strips 48b. Clip members 25e are similar in construction to members 25a, but continuous in configuration, are provided with angular pieces 25f configured to the member 48b and provided further at their ends with dogs 25g adapted to be driven into the supporting member. If desired, the dogs may be dispensed with and nails or screws 25h used in their stead. This construction permits the utilization of clapboarding or wood substitutes, asbestos sheets, and similar constructions as inside or outside facings for completed buildings or interior rooms. In the case of soundproofing rooms and auditoria to prevent undesirable acoustical effects, a sheeting of celotex or other fibrous sound and heat insulating material may be used.

Referring to Figure 15, there is shown a roof grid member which is similar in construction to the floor grid member described above and illustrated in Figures 4, 5, and 14. Owing to the lighter loads normally imposed on roof members as compared to floor members, the parts may be structurally smaller but are usually similar in all other respects. These members comprise web members 40a, having flange portions 41a terminating in the usual clip members 20a. These members are provided with alternate tongue and groove depressions 43a and 42a respectively, which are adapted to coact to form a composite I-beam, as above disclosed.

The air spaces within the grids are of particular value as insulating means and soundproofing. Further desirable advantages may be derived from filling the interior hollow grid spaces, shown more in detail in Figure 16, with ground cork, asbestos, magnesia, gypsum base materials, sawdust, or other pulverulent heat insulating materials 117. These materials may be formed into units or blocks adapted to completely fill the interior grid spaces, or they may as shown at Figure 16, be formed into slabs or sheets 116 adapted to fit into the sides of the grids and of such a length as to be keyed between the said sides and the adjacent keyways. While mineral insulants have been described, it will, of course, be understood that any suitable vegetable insulating material, such as sugar-cane refuse, cornstalk refuse, or other such materials, which are respectively known in commerce as bagasse, or celotex, or insulite may be made use of.

The above construction prevents the transfer of heat, makes the walls soundproof, eliminates the passage of moisture from the exterior of the house to the interior, permits the use of metal and concrete plastics in the tropics and makes a vermin-proof house.

The foundation 150 is prepared in a suitable manner, and preferably of improved grids 151. In this construction the ordinary footing 150a of concrete or the like is prepared and laid down or formed in a suitable trench 150b. Superposed on the footing and bonded thereto in any suitable manner are requisite numbers of foundation grids 151. A channel member 150c may be disposed on the footing and adapted to serve as a guide and retaining member for the alignment and retention of the sides of the grid members 151. These members are fastened together by suitable keys and are connected at the corners by suitable corner grid constructions. The foundation grids are filled with a suitable embedment 152, usually of concrete, in any desirable mixture, and the inner walls smoothed in the ordinary manner, as is the exterior wall above the grade line. Floor grids 40 are superposed on the foundation grids and suitably keyed to each other, after which they are monolithically bonded to the foundation by suitable plastic 153, which may be of the same type as that used in the foundation members. If desired, the floor grids and foundation grids may be assembled, and the plastic then introduced, or as previously described, the plastic embedment for the foundation may be introduced into the foundation grids up to any desired level and the remaining portion applied at the same time as that of the floor grid members, in which case it acts as the bonding agent for the foundation and floor grids. The floor grids may be provided with the usual top and bottom surface coats of plastic 45 and 49 as set forth more particularly above, or they may be filled throughout with concrete or like embedment, and the surfaces smoothed in the ordinary manner.

Where an interior filling is used for the foundation or grid members, the composite structures are ordinarily intended for use in supporting heavy floor loads. As intimated previously, desirable results, permitting marked economies, may be secured by the omission of the central embedment or plastic material, in constructions in which the strength of the structural sheet metal forming the grids is sufficient to sustain the normal loads. This metallic construction and method of bonding permits a pronounced flexibility in construction due to the fact that by varying the configuration of the grid members any desired metallic structure may be made use of, and this latter suitably augmented by the advantage and incorporation in the metallic structural unit of a desirable structural plastic embedment.

Wall grid members 10 of any suitable configuration and design adapted to support any given load are supported on the floor members 40 and monolithically bonded thereto, a suitable channel member 160 being interposed therebetween. This member includes a wall grid receiving portion 161 with which is associated a base moulding member 162. A combined grid channel and base-board are suitably secured, as by crimping together at 163, and are preliminarily positioned on top of the floor grids 40, being secured thereto by any suitable plastic embedment, although, of course, any mechanical means such as bolts and nuts and tie wires may be used, if desired. The wall grids 10 are inserted in the channel members, the latter having been first filled with suitable material, while still pastic, indicated generally at 154. This latter serves as an embedment for the grid members in addition to the locking together of the grids by the improved key members shown and described above. The base moulding is provided with a plasterer's screed 164, which is directed downwardly to form an apron 165 which forms a substantially closed channel 166 with the other parts of the moulding. When the combined grid channel and base moulding is filled with cement or other plastic, the inverted chamber 166 acts as an air chamber or reservoir, and prevents the plastic material from rising therein. The screed 164 serves to support the plastic coat as well as being a guide for the thickness of the coat. It will be observed that there is no continuity between the plastic embedment and the wall coating. This condition serves to prevent the access of absorbed material from the exterior of the building in and through the plastic embedment to the wall coating. This break in continuity of plastic material afforded by the member 162, and more particularly by the intermediacy of the apron portion 165 and the air chamber 166, as above intimated, saves the plastic coatings 103 and 104 from deleterious action of absorbed moisture and permits the fabrication of a completely monolithically surfaced and bonded house without introducing the noxious feature of damp interior walls and rooms normally met with when walls are made of solid concrete or other plastic material, which exercises a capillary attraction for moisture, whether atmospheric or derived from moist earth as in tropical countries.

The floor grid units may be adapted to form concrete beam members monolithically bonded to the floor coverings and supporting walls and columns or partitions by cutting back the top portions 11 from a member 40 a suitable distance to provide an apron portion 170, which is bent downwardly into engagement with the bottom member, and secured thereto in any suitable manner as by means of tie wires 171. When positioned in place and a suitable concrete mix poured therein, it will be noted that a solid segment of concrete, as indicated at 153, is formed in the end portion and is integrally bonded with the mass of concrete indicated at 152 and 154, as well as with the subjacent plastic coatings 103 and 104.

Where wooden floors or the like are desired, suitable supports 172 of wood or other suitable material are embedded in the concrete 45 to a suitable depth, and floor members 47 also of wood or any desired material are laid thereon and fastened thereto, an air space 48 being provided to prevent warping of the floor members.

The base moulding, designated generally by the numeral 162, is set in place being embedded in the concrete mass, and is in turn filled with any suitable aggregate of the types previously described. These members and their associated parts are shown in detail in Figures 20 to 24. Referring more particularly to Figure 21, the base moulding comprises a bottom channel portion 180 bent over at one edge to form an inverted U-shape member 163, the shorter leg of which is adapted to receive any of wall channel members 160, 190 and 191. The longest side of the U is provided at its lower portion with apertures 183 as is the base portion of the member, and is extended above the apertures to form a base board 162, which may be given any desired configuration for ornamental purposes. The plasterer's screed is formed integrally therewith.

Suitably associated with the base moulding is an exterior wall channel 160. This member comprises a bottom portion suitably apertured and provided with a short upstanding portion 184 adapted to engage or fit into member 163, previously described.

The other leg 161 of the member is apertured in the same manner as the base portion, and is provided at its upper end with an out-turned flanged portion 185. The base moulding and exterior wall channel may be fitted together and placed in position on top of the supporting concrete mass and floor members, thus having the combination of a good metallic and structural concrete support, together with the improved bonding effect of the monolithic mass, previously described.

Where partition floors are being constructed, a plurality of base moulding members are joined by a partition channel 191 having upstanding flanges of equal height. This combination of parts is supported on the floor members and their associated fillings in the same manner as the wall moulds and are provided with like plastic fillings.

Referring now to Figures 19 to 24, the details of an exterior wall and floor joint will be described. This construction comprises a combination wall grid cap, as shown in Figure 22, and designated generally by the numeral 195. This member includes a lower inverted channel member having a flat medium portion 196, and depending sides 197, provided with usual apertures 183. The members 197 are provided with upturned flanges 198, which are adapted to serve the joint purpose of a picture moulding support for a picture moulding 199, and also as a plasterer's guide for determining the depth of the initial coat of plastic. The upper portion of the combination grid cap member is formed of a similar channel shaped member having a base portion 200 and side portions 201 and 202. The upper and lower portions of member 195 may be secured together by welding or riveting. Members 201 and 202 are provided with usual apertures 193, and member 202 is provided at its upper edge with a laterally extending flange 203, which also serves as a support for superposed floor members. Member 201 is provided with an inwardly displaced section 204, and is flanged outwardly at its upper portion to form a clip flange 205, which is adapted to engage the tongue 206 of a suitable tie-in member 207. This member in addition to the tongue portion is provided with a body portion 208 having an intermediate section 209 provided with tongues 210, which are adapted to receive flanges of exterior wall clip channel 190. Member 207 is suitably apertured to permit the free flow of monolithic bond material therethrough. At its upper end the member is provided with a flange 185. It will be noted that the upper section of member 207 in combination with members 190 and 162 forms a wall grid receiving channel, permitting a desired continuity of construction. The picture moulding as shown in Figure 19, and designated by the numeral 199, is made from sheet metal and is provided with a clip channel portion 213, which is adapted to engage into member 198 of the wall caps and be supported thereby. The members provided with outstanding portions 211 and 212 are adapted to serve as plasterer's guide for the final plastic coat. A depending tongue or flange 214 is provided at the bottom of the moulding member, and is adapted to be anchored by the applied coat of plastic, thus preventing the picture moulding from being moved out of place.

Referring now to Figure 25, there is shown a detail of an eave and gable construction showing the manner of assembling the several parts to unite angularly disposed structures to the side walls. In this construction there is shown a grid cap member designated generally by the numeral 195 and a superposed floor grid member 40, which, as previously intimated, may be of any suitable dimensions.

The roof members, designated generally by the numeral 216, are secured to the roof connection member 218 by means of hook bolts 217 having hook portions 219 adapted to receive a rod 220 which is inserted in a grooved portion 221 of member 218 and spot welded thereto. The hook bolts are provided with threaded ends 222 which are associated with suitable nuts 223. It will now be appreciated that the member 220 serves as a fulcrum for member 217 about which the latter is adapted to rotate on hook 219, thus enabling any roof angle to be secured. This hinge-like construction permits the construction herein described to be used in roof members of a wide variety of types and in a wide variety of designs, varying from the sharply pitched roofs of extreme northern latitudes to the flat roofs common in tropical countries.

Where the roof members 216 are of the grid type herein disclosed, this invention comprehends the use of an improved facia plate channel designated generally as 224. These members include a drip cap 225, which is adapted to direct water flowing thereover into a suitable gutter 226. Member 222 is provided further with portions 227 bent inwardly toward each other and side portions 228 suitably apertured, the portions 228 being adapted to slip over and engage a roof member and be secured thereto by means of standard bolt and nut construction 229 (Figure 6). These members may have any suitable depth, which can be varied to suit the needs of any installation, and may be provided further with stiffening flanges. A gutter 226 is supported from members 229 by means of woven wire hangers 230.

The members 216 are abutted against each other and are suitably supported on a ridge angle 231, which is suitably apertured, and are secured thereto by suitable bolt and nut construction 232. Members 231, being of machine material may be bent to any suitable angle. The ends of members 216 are abutted at the ridge with cover pieces of expanded material 233 which is laid thereagainst and serves to retain the plaster material 234 which is led through the grids. The underside of the grids are plastered in the ordinary manner with any suitable plaster, or they may be gunited or otherwise treated. In the upper plastic a sheet 235 of suitable waterproof material such as any suitable roofing felt or roofing paper may be applied. Over this waterproof covering is applied a suitable waterproof plastic 236 which may be of suitable color or which may be used or blocked off to imitate shingles or the plaster may serve as an imitation of tiles, shingles or other composition shingles or equivalent materials. Where the wooden or shingle finish is desired, wooden nail strips or sleepers may be disposed in the plaster at suitable intervals and the wooden shingles or wooden clapboards nailed thereto.

The dormer constructions and their associated parts, shown in detail in Figures 27 to 32, include the usual wall grids and associated roof grids, the dormer wall angles being taken care of by providing the wall grids with angularly extending portions, which are formed by cutting or tailoring the usual wall grid 10 to any desired angle. This can be done by an ordinary hack saw or other suitable means on the grid ends, the intermediate expanded metal portions being trimmed to size. The cut-off portion, as well as the bottom of base portion, are adapted to receive clip channel members 355, which is similar to the other grid cap members previously described, and includes the usual apertured side and intermediate base portions. These members are preliminarily secured in their respective positions to the grids by suitable metallic wall grid cap pins 356, which are adapted to be inserted through the grids and associated caps and bent over at both ends to hold them in position. These pins may be of any suitable construction and are made of deformable metal for the purpose described. If desired, tie wire or other suitable means may be used for the same purpose.

Referring now more particularly to Figure 30, the method of securing a dormer roof to a dormer wall includes the use of a headed offset bolt 375, which is passed through the grid cap member and through the roof grid, being secured to the latter by means of the nut 376, a suitable washer or washers 377 being inserted between the nut and the grid. It will be noted that the outside angle of the grid cap serves as a support for the roof grid. The dormer walls may be formed of full sized wall grid members, which are suitably abutted on the attic floor passing through the roof opening, the abutting roof grids being secured thereto in any suitable manner, an angle iron being laid in the valley formed by the abutting members and juxtaposed thereto and secured by suitable nut and bolt construction and rivets. Any other suitable means of securing the members together may be made use of. Where the dormer walls do not extend to the attic floor, but are supported on the roof grids, they are fastened to these grids in a manner shown in Figures 31 and 32. The cap members 355 suitably secured to the respective grids are mechanically connected by means of a clip angle 380, which abuts both members and are secured thereto in any desired way as by means of bolts and nuts or rivets, or if desired, they may be secured by gas or electric welding, or brazed thereto. This mono-metallic bonding of the abutting metal parts and their connecting members permits the desired expansion and contraction of the several parts without any danger of breakage or tearing parts of the members due to unequal expansion, as the rates of expansion of the added metal and the bonded metal can be and usually are substantially the same. The use of Tobin bronze as a bonding agent permits a very high degree of speed in assembling without involving any deleterious effects, as the bonding metal being relatively soft with respect to the associated steel or other structural members, provides a desirable take-up in expansion and contraction where the structures are exposed to temperature extremes. It will thus be appreciated that the dormer walls and their supporting roofs may be secured together either mechanically or substantially autogenously. By suitably varying the position of the clip angle member, the outer edge of the supported dormer wall may extend beyond the supporting edge of the roof grid, as shown in Figure 31, or it may be reversed and the two outer edges supported flush with each other. This latter construction permits a saving in plastic bonding material normally applied to the members, and is especially suited for constructions in which the structural strength of the roof members is depended solely upon the metallic grids and not on a composite grid or embedded plastic, such as concrete or neat cement or the like. The joints between the several grid members in the dormer and roof constructions are reenforced by the usual plastic embedment previously referred to, the latter being flowed into the grid members and through the apertures in the grid caps permitting the desired monolithic bonding of the parts, as well as supplying a sufficient coating material which may serve as an initial plastic coat, or which may be reenforced by a similarly applied outer coat having any desired characteristics, such as moisture resistance and the like. The grid members are secured together in the manner and include substantially the same structural members as described above.

Having now particularly described and ascertained the nature of my said invention and in what manner the same is to be performed, I declare that what I claim is:

1. In a building construction of the type described, a wall construction comprising a plurality of abutted and interlocked, self-supporting wall grids having spaced faces, the said grids having keyways formed in the ends thereof, the said keyways comprising a plurality of recess portions including lateral flange portions adapted to coact with like portions on adjacent units, service pipes fitted in said grids and between said faces and a cementitious filling disposed in said grids.

2. In a building construction of the type described, and comprising abutted and interlocked self-supporting grid units having a plurality of keyways formed in the ends thereof and adapted to receive a plurality of keys, the improvement comprising key members adapted to be attached to abutting wall grids, the said key members being continuous and substantially the length of the associated wall grids and wooden studs attached to said key members, the studs serving as supports for a wooden surfacing.

3. An improved building construction comprising a continuous metallic skeleton formed from self supporting and mutually interlocked grid units, cementitious fillings for certain portions of said grid units and cementitious coatings for all of said grid units, the whole comprising a substantially monolithic structure supported on a steel skeleton, the monolithic superstructure comprising spaced cementitious wall portions supported on structural steel members.

4. In a building structure described and claimed in claim 3, the improvement comprising a building having walls, floors and ceilings of spaced cementitious materials providing an air space therebetween, said cementitious materials being formed in place on a continuous metallic structure.

5. As an article of manufacture, a building construction comprising a continuous steel core and a cementitious surfacing for said core, the steel core being composed of self supporting rigid grid units having spaced walls and flange means disposed between said walls adapted to receive locking means for locking engagement to other like units said flanged means comprising a plurality of recessed portions and keys disposed in the said recessed portions and substantially co-extensive with the said grid units.

6. A self-supporting construction unit comprising a grid-like member having separate end portions and separate side portions, the said end members being so configured and arranged as to form a central keyway and having lateral flange portions forming other keyways, both said keyways forming means for engaging and interlocking with other like units in combination with separate securing members, the said side members being mechanically secured to and by said lateral flange portions.

7. A self-supporting construction unit comprising a grid-like member having separate end portions and separate side portions, said side portions having laterally reinforcing ribs, the said end members being so configured and arranged as to form a central keyway and having lateral flange portions forming other keyways, both said keyways forming means for engaging and interlocking with other like units in combination with separate securing members, the said side members being mechanically secured to and by said lateral flange portions.

8. A structural member for steel houses and like building constructions comprising a pair of spaced panel members, a pair of end members secured to and spacing the said side members and means formed in the said end members for receiving keys for securing the units to like units, certain of said key receiving means being adapted to serve as side wall securing means in the said units.

9. An assembled series of independent units in engagement with each other to form a building structure, each said independent unit comprising a pair of side walls and a pair of end walls in locking relation to each other to form a self-supporting unit, the end walls of said units being provided with means for locking same to adjacent units, the whole structure being provided with covering material engaging the several structural units and substantially maintaining them in assembled position.

10. An assembled series of independent units in engagement with each other to form a building structure, each said independent unit comprising a pair of side walls having reinforcing ribs and a pair of end walls in locking relation to each other to form a self-supporting unit, the end walls of said units being provided with means for locking same to adjacent units, the whole structure being provided with concrete covering material engaging the several units and substantially maintaining them in assembled position.

11. In building constructions comprising self-supporting metal grid sections having separate spaced side and end walls, said end walls having keyways formed therein, and key means retaining abutting sections together in locking relation, a basement portion comprising vertically disposed grid sections substantially completely filled with a cementitious plastic, floor sections mounted on said basement sections and connected thereto, wall sections superposed on said floor sections, and roof sections superposed on and connected to the wall sections, the said floor, wall and roof sections being provided with external plastic coats, the said several sections being further provided at their junction points with permanent reinforcing grid forms and a continuous structural plastic mass disposed therein and extending into the interior of the said several sections, the whole buildings forming continuous metallic reinforced structures having cementitious bonding throughout.

GUY F. KOTRBATY.